Dec. 6, 1932.                A. G. COLE                1,889,823
                       TIRE MOLD MANUFACTURE
                       Filed June 21, 1928        2 Sheets-Sheet 1
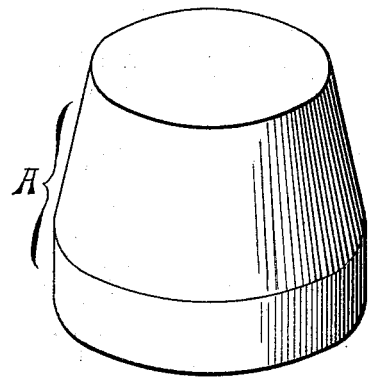
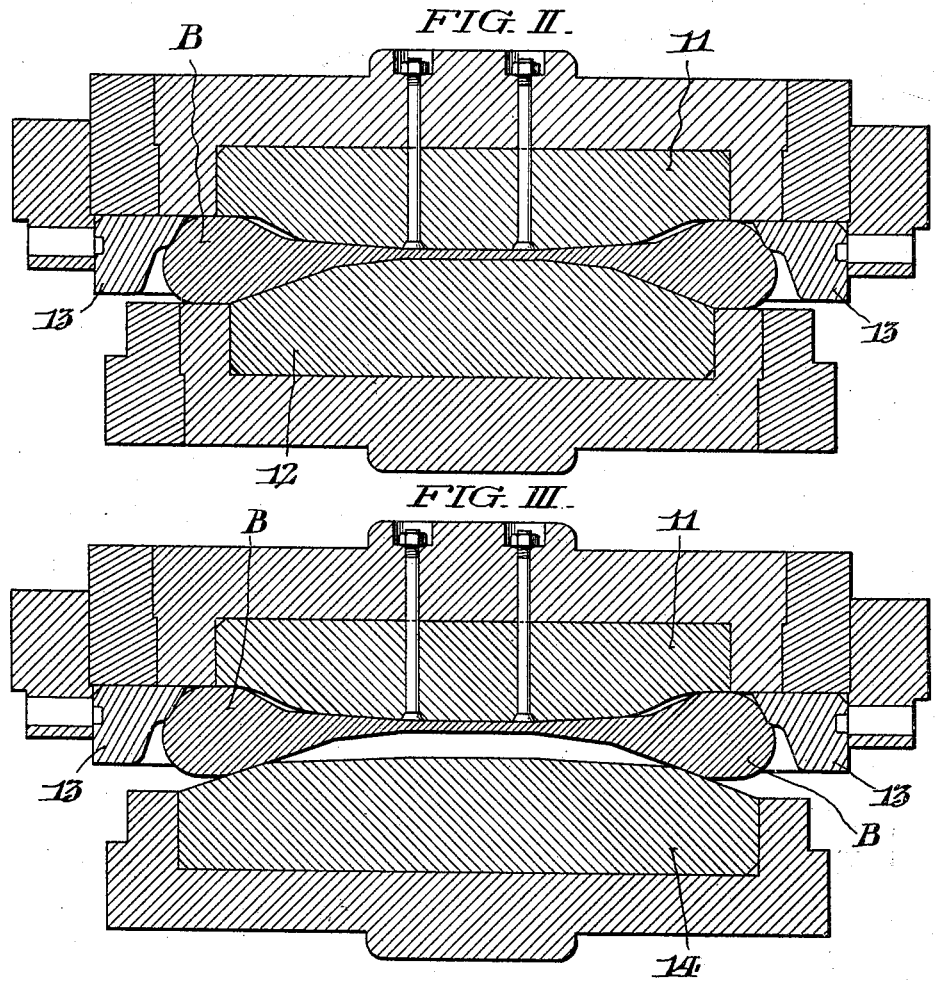

Dec. 6, 1932.  A. G. COLE  1,889,823
TIRE MOLD MANUFACTURE
Filed June 21, 1928   2 Sheets-Sheet 2
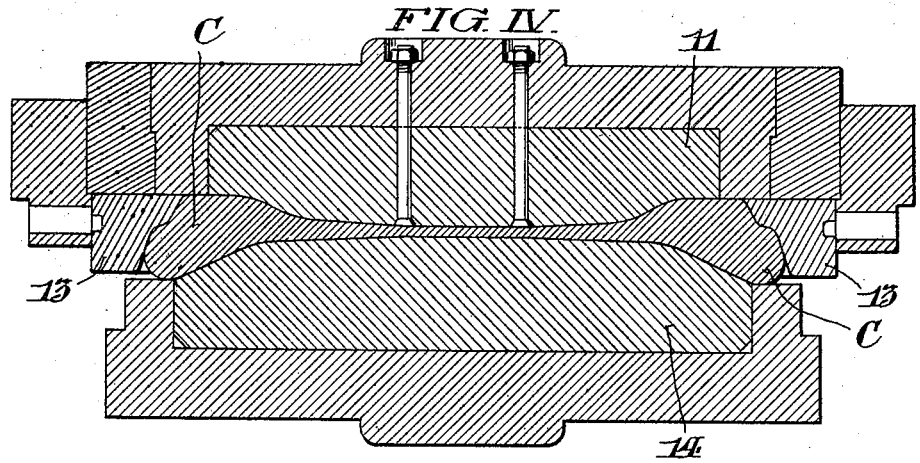
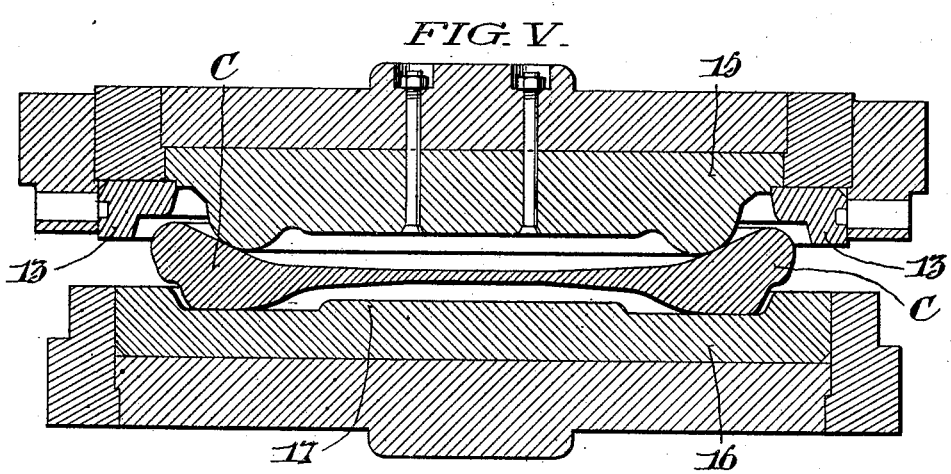
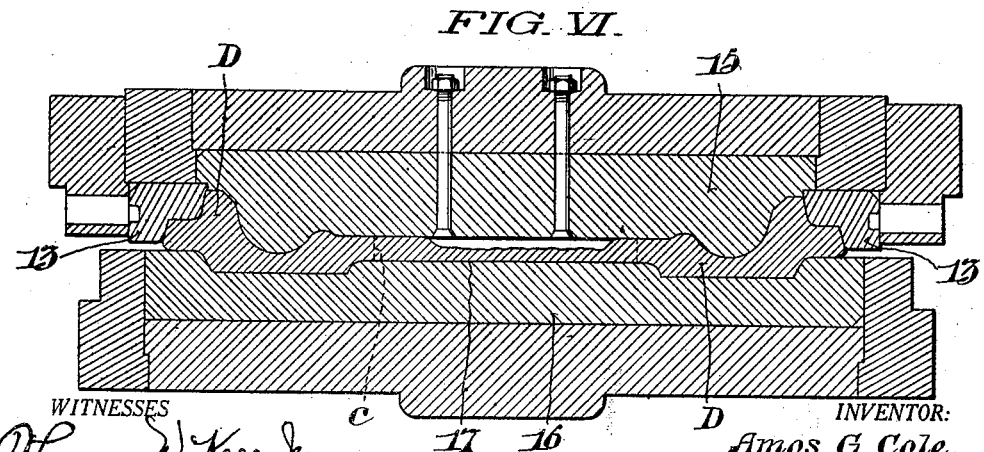
INVENTOR:
Amos G. Cole,
BY Fraley Paul
ATTORNEYS.

Patented Dec. 6, 1932

1,889,823

UNITED STATES PATENT OFFICE

AMOS G. COLE, OF BURNHAM, PENNSYLVANIA, ASSIGNOR TO STANDARD STEEL WORKS COMPANY, OF PHILADELPHIA, PENNSYLVANIA, A CORPORATION OF PENNSYLVANIA

TIRE MOLD MANUFACTURE

Application filed June 21, 1928. Serial No. 287,106.

This invention relates to tire mold manufacture, and is particularly concerned with the forging of the main parts or side pieces of steel molds used in making rubber tires, such as automobile tires or shoes. The invention is in some aspects an improvement of that set forth in the pending application of Amos G. Cole and Harry B. Cochran, Serial No. 426,143, filed November 24, 1920, now Patent No. 1,831,288. A main object of the invention is the rapid and economical manufacture of forged steel tire molds of good quality. For the information of those desiring to practice our invention, we have hereinafter described one preferred mode of carrying it out.

In the drawings, Fig. I is a tilted view of one form of steel ingot, bloom, or slug suitable as the starting point for our process.

Fig. II is a somewhat diagrammatic vertical sectional view, illustrating a pair of dies employed in carrying out our invention, and the partly shaped bloom or blank produced in them.

Fig. III is a similar view of a subsequent pair of dies, just beginning to close on the blank shown in Fig. II.

Fig. IV shows the dies of Fig. III fully closed, and the blank produced in them.

Fig. V shows a subsequent pair of dies, just beginning to close on the blank shown in Fig. IV; and, Fig. VI shows the dies of Fig. V fully closed, and the forged tire mold side piece produced in them.

In making a forged steel tire mold side piece, a steel slug of the shape and of about the proportions illustrated in Fig. I may be employed,—this being one of the shapes described in a paper by Lawford H. Fry published in the 1919 Year Book of the American Iron and Steel Institute, pages 435 to 459. Such a slug A may either be an individually cast ingot produced according to the practice described in said paper, or a section of a larger ingot produced in any suitable and convenient way. A satisfactory steel for this slug is a basic or acid open hearth manganese steel containing about .25% to .35% carbon and otherwise of about the composition mentioned at the beginning of the aforesaid paper as used in wheels and tires. The style, size, and weight of the slug, will, of course, be determined by the particular size and weight of forged steel tire mold side piece to be produced, with due allowance for "shrinkage" or loss of metal in the processes of manufacture.

After being brought to proper temperature for die-pressing—say a light yellow, or about 2000° F.,—the slug A is placed between upper and lower forging dies 11 and 12 (Fig. II) in a powerful hydraulic forging press, as of 10,000 tons capacity. The hot slug A is carefully centered on the lower die, and the dies 11 and 12 are then progressively forced together on it, so as to bring the hot metal into substantially the flattened torus configuration shown in Fig. II. The operation may be characterized as "displacing by piercing the ingot". The piercing is not complete, however: i. e., the torus formed is left with a relatively much thinner central web. The flow of the metal is outward toward the forming and rounding band 13 of the upper die 11. The resultant die forged bloom or blank B does not fill the die cavity completely: on the contrary, the metal flows away from the dies 11, 12 at several points,—just coming in contact with the band 13, and standing away from the die 11 at the inside of the torus. As a whole, the blank B is rather irregular and unsymmetrical.

The resultant partly formed bloom B is then temporarily removed from the dies 11, 12, and the lower die 12 replaced with the die 14 shown in Fig. IV. The bloom B having been carefully centered on this lower die 14, the dies 11, 14 are progressively brought together on it, squeezing it into substantially the thick-margined saucer configuration shown in Fig. IV. In this case, the metal does fill the die cavity and take the peripheral contour of the band 13. Accordingly, the resultant blank C is really symmetrical.

This partly formed bloom C is now reheated to proper die-pressing temperature, and placed between the upper and lower dies 15 and 16 shown in Fig. V, being turned over side for side as compared with Fig. IV, and carefully centered on the bottom die 16. As will be seen from comparison of Figs. V and VI, the form of the blank C resembles that of the final mold piece D a good deal, especially at its outer periphery. The cavity in the bottom of the blank C as it rests on the die 16 is considerably larger and deeper than the central "hub" projection 17 of the die 16, so that it does not initially touch the latter. The blank C rests firmly on the flat bottom of the annular channel in the die 16, without any tendency toward displacement when the descending upper die 15 comes in contact with the blank.

The central web $c$ of the piece D may now be cut out as indicated in dotted lines in Fig. VI, and the mold piece machined and finished as usual.

It will be observed that in the process as a whole the metal is displaced downward and radially,—in the main outward, especially in the first two operations. In the last two operations, the displacement is mainly radial. While the displacement is almost entirely outward in the intermediate operation, in the last operation it is both inward and outward to a considerable degree. In the last operations, also, where the exact placement of the metal becomes important, the dies first strike the metal so as to start it toward where it is to go ultimately: there is no dependence on a mere brute squeeze to force the metal "up hill". In allowing this to be done, the initial outward and upward slope of the periphery of the blank C in the final operation (Fig. I) is important, as well as the initial clearance between the central web C and the die boss or hub 17. In the intermediate operation, the torus is enlarged radially and circumferentially, and the central web is stretched out thinner. In the final operation, there is a downward and outward squeeze on the outer corner or rim edge of the "saucer", and a downward squeeze on its inward slope that shifts part of the metal inward to fill out the die cavity. The central web of the forged piece D does not completely fill the center of the mold, even on the final squeeze. Throughout, there is always somewhere for the metal to flow radially: the point is never reached where the radial die pass is completely closed against either inward or outward flow,—though the latter condition is indeed approached at the conclusion of the final operation.

It will be understood that the details of construction of the dies employed and other details of the apparatus and process may conform to the above-mentioned application, Serial No. 426,143.

As to the shapes and action of the dies, it will further be observed that the top die 11 used in the first and second operations—when the ingot-blank A is first squeezed out into the oblate inward-tapering (webbed) torus B of pear-shaped cross section, and this torus further squeezed out into an (inverted) saucer C—has a convex central boss surrounded by the circumferential forming band 13. The lower die 12 for the first operation has a convex central boss surrounded by a flat margin; while the lower die 14 for the second operation has a larger but flatter-topped central boss,—also shown surrounded by a (narrower) flat margin. In the second operation, the pressure of the die 14 is initially applied to the taper of the pear section inside its greatest thickness, squeezing and flattening the pear section into saucer form by radial displacement of metal, mainly outward. The inverted saucer C formed in this second operation is characterized, it will be seen, by a flat, centrally concave-recessed upper side (bottom) and a concavely dished, centrally flat lower side (topside), and by a thick rim which is externally bevelled upward and inward (regarding the saucer in its inverted position of Fig. IV) and internally flared downward and outward, and intermediately well rounded off. The reversal of the saucer C from its inverted position of Fig. IV to its normal position of Fig. V results in formation of the die cavity in the inside flare of the rim,—the pressure of the top die 15 being initially applied at this point as shown in Fig. V. In the latter part of the closing movement of the dies 15, 17, the bottom of the saucer C is flattened downward, and is (in part) thickened by inward displacement of the metal of the saucer rim,—as will be evident from comparison of Figs. V and VI. This, as already explained, brings the piece substantially to its final forged shape D.

Having thus described my invention, I claim:

1. An improvement in die-pressing an ingot, as distinguished from rolling or hammering, into a tire mold side piece of usual annular concave shape, by initially piercing and squeezing out the ingot into an annular blank with central web, and subsequently pressing the die cavity in the blank; which improvement comprises initially die-pressing the ingot into an oblate inward tapering webbed torus of pear-shaped cross-section, and then squeezing the same into a saucer form characterized by a concavely dished, centrally flat topside and a flat, centrally concave-recessed bottom side, and having a thick rim externally bevelled downward and internally flared upward, and intermediately rounded off, by pressure initially applied to the taper of the pear section inside its greatest thickness, and thereafter die-pressing the mold cavity in the inside flare of the rim and the piece to its final forged shape.

2. The improvement as set forth in the preceding claim, further characterized in that the blank of pear section is squeezed to saucer form between dies initially affording central clearance, as well as room for outward flow or expansion of the metal.

3. The improvement as set forth in the first claim, further characterized in that the saucer-shaped blank is brought to final forged shape between dies initially affording clearance and room for inward flow of the metal at the outer side or bottom of the saucer blank, as well as for outward flow at the rim of the blank.

4. An improvement in die-pressing an ingot, as distinguished from rolling or hammering, into a tire mold side piece of usual annular concave shape, by initially piercing and squeezing out the ingot into an annular blank with central web, and subsequently pressing the mold cavity in the blank; which improvement comprises initially hot die-pressing the ingot into an oblate inward-tapering torus, of pear-shaped cross-section; then reheating and further die-pressing and squeezing out the blank, flattening the pear section by radial displacement of metal, into a saucer form characterized by a concavely dished, centrally flat topside and a flat, centrally concave-recessed bottom, with a thick rim externally bevelled downward and inward and internally flared upward, and intermediately rounded off; and thereafter reheating and reversing the saucer and die-pressing the annular mold cavity in the inside bevel of said rim and concurrently flattening the bottom, thus bringing the piece substantially to its final forged shape.

5. An improvement in die-pressing an ingot, as distinguished from rolling or hammering, into a tire mold side piece of usual annular concave shape, by initially piercing and squeezing out the ingot into an annular blank with central web; and subsequently pressing the mold cavity in the blank; which improvement comprises initially squeezing out the ingot, between a bottom die with a convex central boss surrounded by a flat margin and a top die with a convex central boss surrounded by a bevelled circumferential forming band, into an oblate internally webbed torus of pear-shaped cross-section; then further squeezing out the blank between said top die and a bottom die with a larger but flatter-topped convex central boss than the initial one; into an inverted saucer characterized by a flat, centrally concave-recessed upper side (bottom) and a concavely dished, centrally flat lower side (topside), with a thick rim externally bevelled upward and inward (regarding the saucer in its inverted position) and internally flared downward and outward, and intermediately rounded off; and thereafter reversing said inverted saucer, and in another set of dies die-pressing the annular mold cavity in the inside bevel of said rim and also flattening the saucer bottom, thereby bringing the piece substantially to its final forged shape.

In testimony whereof, I have hereunto signed my name at Burnham, Pa., this 12th day of June, 1928.

AMOS G. COLE.